United States Patent [19]

Jester

[11] Patent Number: 4,856,362
[45] Date of Patent: Aug. 15, 1989

[54] TRANSMISSION SHIFT RAIL INTERLOCK

[75] Inventor: Terry L. Jester, Stony Ridge, Ohio

[73] Assignee: Dana Corporation, Toledo, Ohio

[21] Appl. No.: 164,150

[22] Filed: Mar. 4, 1988

[51] Int. Cl.$^4$ ............................................. G05G 5/10
[52] U.S. Cl. ................................... 74/477; 74/483 R
[58] Field of Search ................ 74/477, 483 R, 483 P, 74/483 K

[56] References Cited

U.S. PATENT DOCUMENTS

| | | | |
|---|---|---|---|
| 1,537,584 | 5/1925 | Carhart | 74/477 |
| 2,579,872 | 12/1951 | Segal et al. | 74/483 |
| 2,584,038 | 1/1952 | Morrison | 74/483 |
| 3,387,501 | 6/1968 | Frost | 74/477 |
| 3,929,029 | 12/1975 | Kelbel | 74/477 |
| 4,068,537 | 1/1978 | Wolfe | 74/477 |
| 4,120,212 | 10/1978 | Philipsen | 74/477 |
| 4,132,125 | 1/1979 | Janiszewski | 74/477 |
| 4,296,642 | 10/1981 | Schetter | 74/477 |
| 4,409,859 | 10/1983 | Yarnell | 74/477 |
| 4,445,393 | 5/1984 | Braun | 74/477 |
| 4,448,094 | 5/1984 | Yarnell | 74/477 |
| 4,550,628 | 11/1985 | Yarnell | 74/477 |
| 4,676,115 | 6/1987 | Morscheck et al. | 74/339 |

FOREIGN PATENT DOCUMENTS

| | | | |
|---|---|---|---|
| 179978 | 10/1954 | Austria | 74/483 |
| 276221 | 7/1914 | Fed. Rep. of Germany | 74/477 |
| 895253 | 11/1953 | Fed. Rep. of Germany | 74/477 |
| 1007392 | 2/1952 | France | 74/477 |

Primary Examiner—Allan D. Herrmann
Attorney, Agent, or Firm—MacMillan, Sobanski & Todd

[57] ABSTRACT

A shift rail interlock mechanism (18) for a transmission having a plurality of parallel shift rails (16a,16b,16c) is operative to inhibit movement more than one shift rail from its neutral position at a given time. The interlock mechanism includes a support member (20) which supports the rear ends of the shift rails for axially shiftable movement along their respective axes. The support member (20) has an aperture (30) formed therein which extends transversely to and intersects the shift rails. A separate interlock pin (31,32) is slideably mounted within the aperture between each pair of shift rails. Each of the interlock pins is provided with tapered end portions (31b,31c) defining end surfaces (31d,31e) engageable with end surfaces of adjacent pins. Each of the shift rails (16a,16b,16c) is provided with a separate notch (933a,33b,33c) for receiving the tapered end portion of at least one of the interlock pins and which is in transverse alignment with the notches of the other shift rails when the transmission is in a neutral position. Movement of any one of the shift rails from its neutral position causes the notch of the shifted rail to engage the tapered end portion of one of the interlock pins such that the pin is moved axially within the aperture. The shifted rail secures the interlock pins in a predetermined fixed position within the notches of the other shift rails to prevent the other shift rails from moving from their neutral position until the shifted rail has been returned a neutral position.

13 Claims, 2 Drawing Sheets

TRANSMISSION SHIFT RAIL INTERLOCK

BACKGROUND OF THE INVENTION

The present invention relates generally to a transmission gear shifting assembly and, in particular, to an interlock mechanism for inhibiting shifting of more than one shift rail at a given time.

Multi-speed change gear transmissions of both the sliding gear and the sliding clutch type, and the shifting mechanisms for the selective shifting thereof, are well known. In the sliding gear type, selected gears are moved into meshing engagement with other gears and, in the sliding clutch type, constantly meshed gears are selectively coupled to a shaft by means of a slideable clutch. In such transmissions, the slideable gear or clutch member is typically provided with a groove in which a shift fork or other shifting member is received for imparting a selected axial movement thereto. The shift forks are carried by, or at least selectively axially moved by, an axially moveably shift rail or bar.

The shift rails typically have an axially centered neutral position and are moveable in a first and possibly a second axial direction to engage a selected gear. Accordingly, in transmissions of this type, one shift rail is required for at least every pair of selectively engageable gears. Generally, the plurality of axially moveable shift rails are supported in spaced apart, parallel relationship, usually within and near the top of the transmission housing.

In most multi-speed transmissions of the type described above, in order to prevent damage to the gearing and/or clutch components, it is important that only one shift rail be permitted to move from its neutral position at any one time. Accordingly, most manual transmissions incorporate some type of interlock mechanism to inhibit movement of more than one shift rail at a given time. In most interlock mechanisms, movement of any one of the shift rails from its neutral position actuates a locking component which in turn is coupled to block any axial movement of the other shift rails until the one shift rail has been returned to a neutral position.

Many various types of shift rail interlock mechanisms have been proposed. For example, U.S. Pat. Nos. 3,387,501; 4,120,212; and 4,296,642 disclose the use of pin and/or ball type interlock mechanisms. Examples of locking plate type interlock mechanisms can be found in U.S. Pat. Nos. 3,929,029 and 4,132,125.

While the prior art interlock mechanisms have performed satisfactorily, many of these mechanisms are relatively complicated and difficult to manufacture.

SUMMARY OF THE INVENTION

The present invention relates to a unique transmission interlock mechanism which is simple in its construction as compared with many prior art devices, and thus represents a potentially significant cost savings.

The shift rail interlock mechanism is utilized with a transmission having a plurality of shift rails which are shiftable along spaced apart and parallel axes. In accordance with the preferred embodiment of the present invention, the interlock mechanism is incorporated into a housing or support means which supports the rear ends of the shift rails for axially shiftable movement along their respective axis. The housing means includes an aperture which intersects the shift rails and extends generally transverse to the axes of the shift rails.

In the preferred embodiment of the invention, the shift rail interlock mechanism is utilized in conjunction with a transmission having three parallel shift rails. In this embodiment, a pair of interlock pins are slideably mounted within the transverse aperture, with a separate interlock pin located between adjacent ones of the shift rails. Each of the interlock pins is provided with tapered end portions defining end surfaces engageable with end surfaces of the adjacent pin.

Each of the three shift rails is provided with a separate notch means for receiving the tapered end portions of the interlock pins. In the preferred embodiment of the invention, each shift rail has a rectangular cross section and is provided with a downwardly facing semi-cylindrical notch having chamfered edges. The notches are located along the shift rails such that, when each of the notches are in axial alignment with one another along the axis of the transverse aperture, the transmission is in a neutral position. When any one of the shift rails is axially shifted from the neutral position, the notch of the shifted rail engages the tapered end portion of the interlock pin extending into its notch and causes the pin to move axially within the aperture out of the respective notch. In this situation, the shifted rail is engageable with the end surface of the moved pin to temporarily secure the two pins in a predetermined fixed axial position within the two notches of the other two shift rails to prevent axially shiftable movement of these two shift rails until the one shifted rail is returned to a neutral position.

DESCRIPTION OF THE PREFERRED EMBODIMENT

Figure 1:
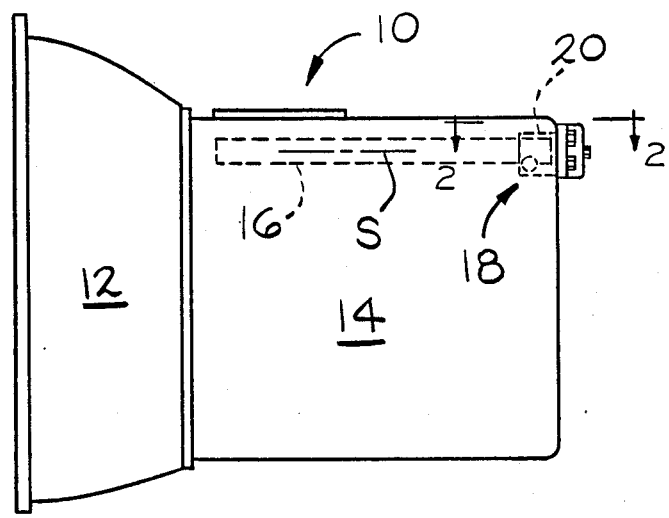
FIG. 1 is a side elevational view of a transmission which incorporates the interlock mechanism of the present invention.

Referring to FIG. 1, there is shown a side elevational view of a transmission 10 which can utilize the interlock mechanism of the present invention. In particular, the transmission 10 includes a front bell housing 12 containing a clutch assembly (not shown), and attached to a rear case 14 containing the transmission gearing (also not shown). The transmission is shifted between its various gear ratios by means of a plurality of spaced apart and parallel shift rails, one of which is illustrated in dashed form in FIG. 1 as a shift rail 16. The shift rail 16 is supported within the case 14 for axial movement along a shift axis S.

The interlock mechanism of the present invention, generally represented in FIG. 1 by reference numeral 18, is provided to inhibit movement of more than one shift rail at a time. In the preferred embodiment, the interlock mechanism 18 is located in top rear portion of the case 14, and is carried by a rear shift rail housing or support member 20.

Generally, each shift rail has a downwardly extending shifting fork (not shown) secured thereto which in turn is coupled to a shifting collar used to shift the transmission from a neutral position to either one of two different gear ratios. Each shift rail can typically be moved axially between three positions: (1) a forward position defining a particular gear ratio, (2) a central, neutral position, and (3) a rear position defining a different gear ratio. The number of shift rails located in the case 14 is typically related to the total number of selectable gear ratios provided by the transmission. For example, in order to provide for a single reverse gear and five forward gears, three shift rails would be required. The interlock mechanism of the present invention is specifically described herein in conjunction with a transmission having three shift rails. However, it will be appreciated the interlock mechanism can be used in a transmission having other than three shift rails.

Also, it should be noted that the interlock mechanism of the present invention can either be used with a conventional, manually shifted transmission or an automatically shifted transmission. In a manually shifted transmission, the shift rails are moved manually by a vehicle operator via a conventional shift lever (not shown) while, in an automatically shifted transmission, the shift rails are moved automatically by, for example, a fluid-operated actuating cylinder.

Figure 2:
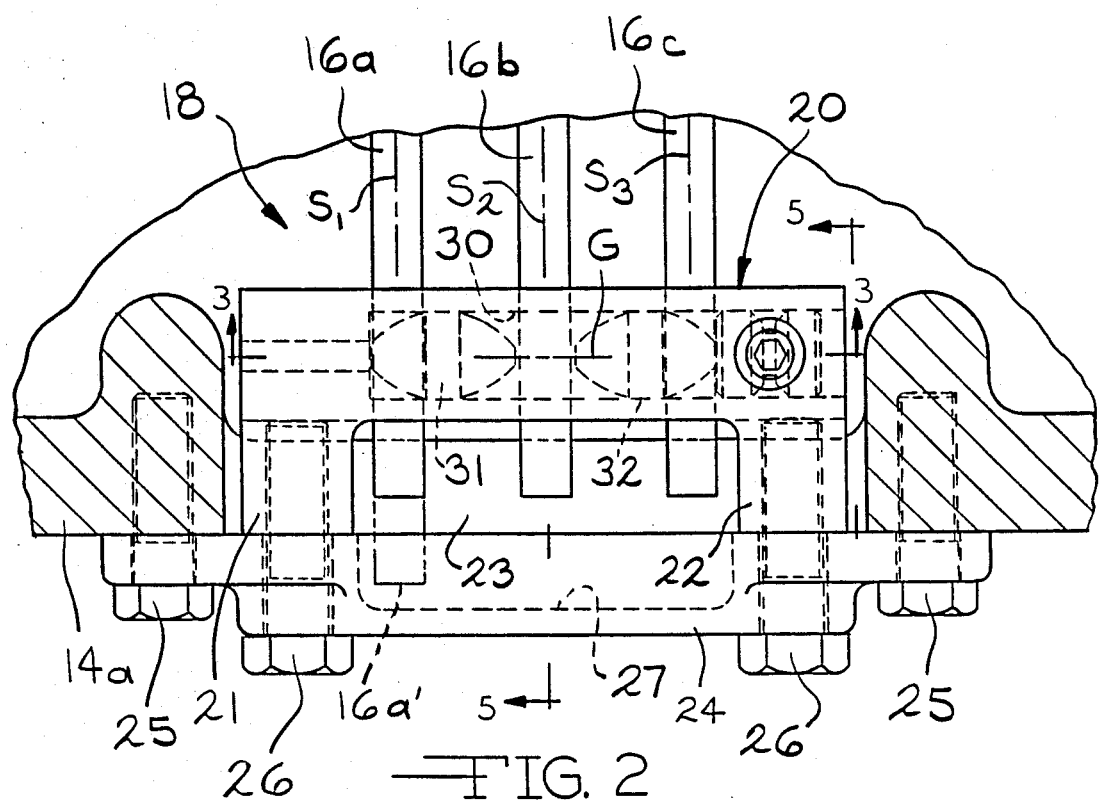
FIG. 2 is a sectional view taken along the line 2—2 of FIG. 1 and illustrating a top view of the interlock mechanism of the present invention.

Referring now to FIGS. 2 through 6, the specific construction of the interlock mechanism 18 will now be discussed. In FIG. 2, a plurality of shift rails 16a, 16b, and 16c are shown in spaced apart and parallel relationship. Each of the shift rails has a generally rectangular cross-section and has a rear end slidably received within a respective one of a plurality of rectangular apertures 20a, 20b, and 20c (shown in FIG. 3) provided in the support member 20. The support member 20, as shown in FIG. 2, includes spaced apart legs 21 and 22 which extend rearwardly through an opening 23 provide in a rear wall 14a of the transmission case 14. A retaining plate 24 covers the opening 23 and is secured to the rear wall 14a by a plurality of cap screws 25. The support member 20 is secured to the retaining plate 24 by a pair of cap screws 26 extending through apertures formed in the plate and threaded into the legs 21 and 22.

Figure 3:
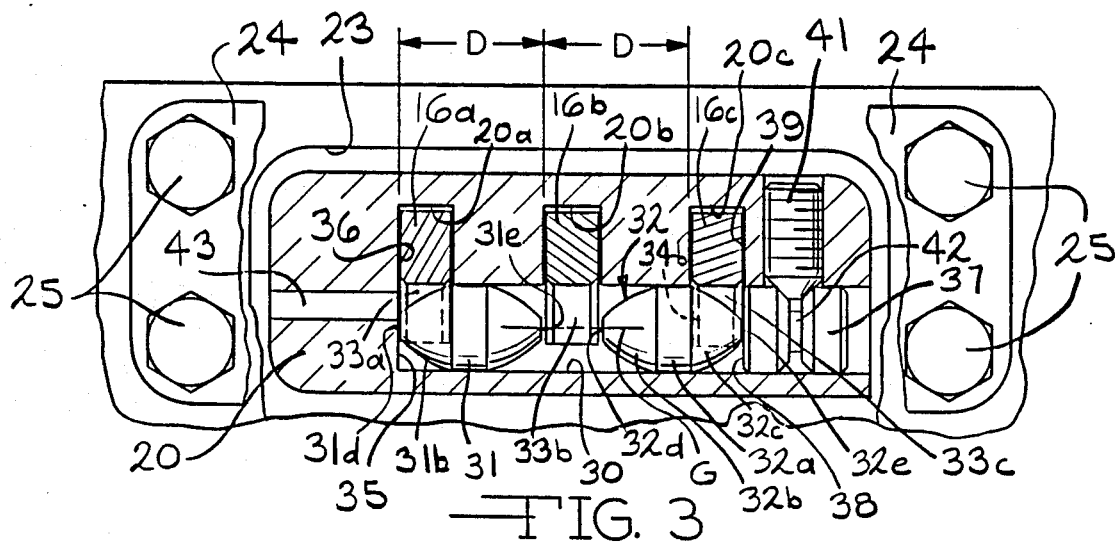
FIG. 3 is a sectional view taken along the line 3—3 of the FIG. 2 and illustrating the shift rails of the transmission in a neutral position wherein the interlock pins are positioned to enable axially shiftable movement of the center shift rail, but block shiftable movement of the two outside shift rails after the center rail has been shifted.
Figure 5:
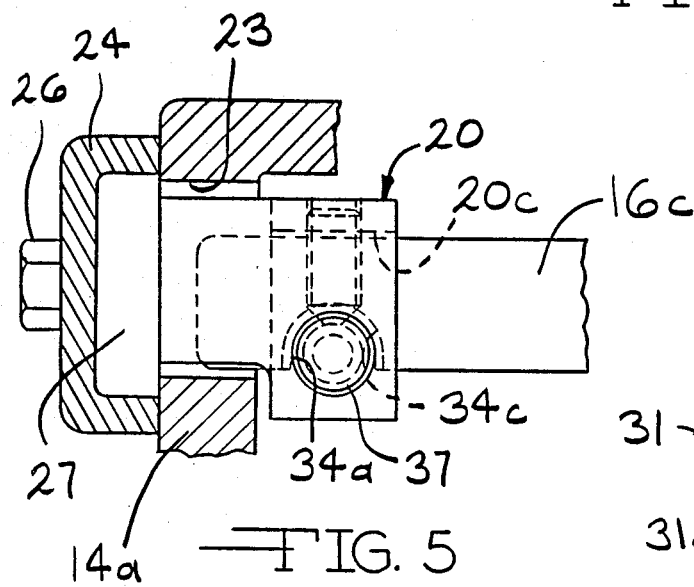
FIG. 5 is a sectional view taken along the line 5—5 of FIG. 2.

The shift rails 16a, 16b, and 16c are moveable along axes $S_1$, $S_2$, and $S_3$, respectively. In FIGS. 2, 3, and 5, all three shift rails are shown in a neutral position, wherein the extreme rear end of the shift rail extends into the opening 23. From their neutral position, each of the shift rails can be moved in either axial direction to select a particular gear ratio. In order to accommodate axial rearward movement of the shift rails, such as when the shift rail 16a is shifted to the phantom position at 16a' shown in FIG. 2, the retaining plate 24 is provided with a pocket 27 for receiving the extreme rear ends of the shift rails.

In accordance with the present invention, the interlock mechanism 18 is contained within the support member 20. As shown in FIG. 3, the support member 20 is provided with an aperture 30 having an axis G which extends transversely to the shift rail axes $S_1$, $S_2$, and $S_3$.

The axis G is spaced slightly above the bottom surfaces of the shift rails. The aperture 30 is adapted to receive a pair of interlock pins 31 and 32 which, as will be discussed, are axially slideable within the aperture and are always positioned to permit movement of only one shift rail at a time.

Figure 6:
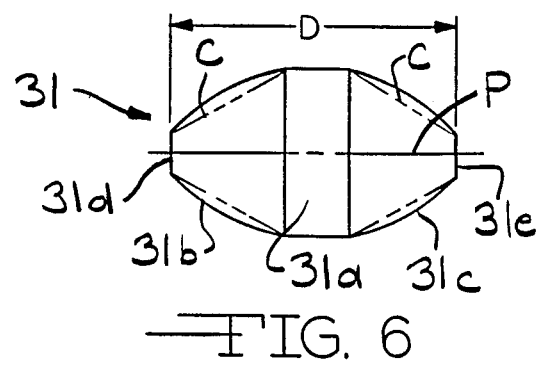
FIG. 6 is an enlarged elevational view of the interlock pin which is utilized with the present invention.

Referring now to FIG. 6, there is shown an enlarged view of the interlock pin 31, which is identical to the interlock pin 32. The pin 31 includes a central cylindrical portion 31a, and tapered end portions 31b and 31c. The tapered end portion 31b defines an end surface 31d, while the tapered end portion 31c defines an end surface 31e. The cylindrical portion 31a is formed of a diameter slightly less than the diameter of the aperture 30, so as to permit the pin 31 to slide freely within the aperture. The length of the pin is represented as a distance D, and is identical to the spacing between corresponding side walls of the apertures 20a, 20b, and 20c, as shown in FIG. 3. The interlock pin 32 is identical to the pin 31 and includes (as shown in FIG. 3) a central cylindrical portion 32a, tapered end portions 32b and 32c, and end surfaces 32d and 32e.

Referring now to FIGS. 2 and 5, the shift rails 16a, 16b, and 16c are provided with downwardly facing notches 33a, 33b, and 33c, respectively, which, as will be discussed, cooperate with the interlock pins 31 and 32 to only permit movement of one shift rail at a time. In the preferred embodiment of the invention, each of the notches includes a semi-cylindrical portion having chamfered edges. For example, as shown in FIGS. 2 and 5, the notch 33c of the shift rail 16c includes a cylindrical portion 34a having chamfered edges 34b and 34c. The cylindrical portions are form of a diameter substantially equal to the diameter of the aperture 30.

When all of the shift rails are in their neutral position, as shown in FIGS. 2, 3, and 5, the notches will be in transverse alignment with the axis G of the aperture 30. In this instance, the pins 31 and 32 can slide freely within the aperture. The left end of the aperture 30 is provided with an end wall 35 which, as shown in FIG. 3, is in vertical alignment with an outer side wall 36 of the shift rail aperture 20a. The end wall 35 engages the end surface 31d of the pin 31 to limit the movement of the pin toward the left. The right end of the aperture 30 is closed by means of a cylindrical plug 37 having an inner end wall 38 in vertical alignment with an outer side wall 39 of the shift rail aperture 20c. The plug 37 is secured within the aperture 30 by a set screw 41 threaded into the support member 20 and having a lower end which engages an annular central groove 42 formed in the plug. The inner end wall 38 of the plug 37 engages the end surface 32e of the pin 32 to limit the movement of the pin toward the right.

As shown in FIG. 3, a smaller aperture 43 extends between the left end of the support member 20 and the aperture 30. The smaller aperture assists in the disassembly of the interlock mechanism by enabling a tool to be inserted therethrough to knock the pins 31 and 32 from the aperture 30.

In operation, the pins 31 and 32 will always be situated in the aperture 30 such that only one shift rail is permitted to move from its neutral position at a given time. For example, in FIG. 3, the pins 31 and 32 are shown in a position such that the center shift rail 16b can be shifted axially in either a forward or reverse direction. Once the shift rail 16b has been moved, the side walls of the shift rail 16b will engage the end surfaces 31e and 32d of the pins 31 and 32, respectively, to maintain the pins in the positions as shown in FIG. 3. When in these positions, the tapered end portion 31b of the pin 31 will engage the chamfered surface of the notch 33a to prevent axial movement of the shift rail 16a, while the tapered end portion 32d of the pin 32 will engage the chamfered edge 34b of the notch 33c to prevent axial movement of the shift rail 16c.

Figure 4:
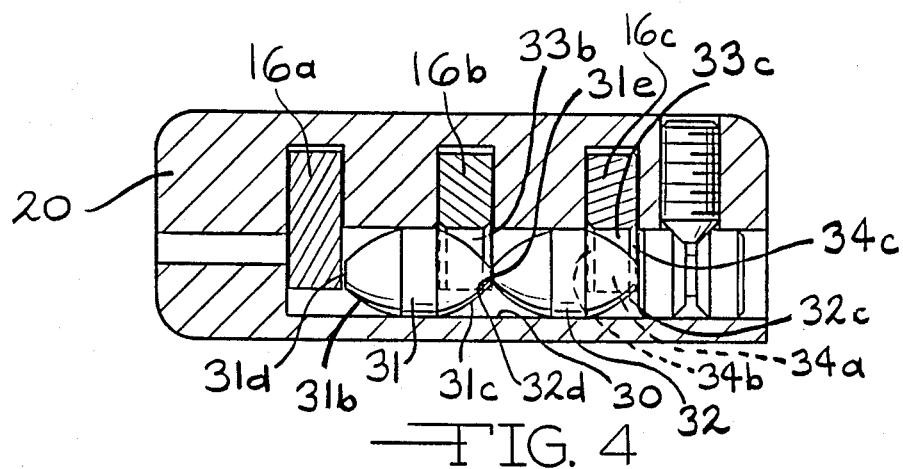
FIG. 4 is a sectional view, similar to FIG. 3, but wherein the left shift rail has been shifted from its neutral position, and the interlock pins are positioned to block axial movement of the other two shift rails.

In the event the pins 31 and 32 are in the position shown in FIG. 3 and it is desirable to shift the shift rail 16a, axial movement of the shift rail 16a in either direction causes the inner chamfered edge of the notch 33a to engage the tapered end portion 31b of the pin 31 and force the pin toward the right to the position shown in FIG. 4. In this position, the end surface 31e of the pin 31 engages the end surface 32c of pin 32, while the inner side wall of the shift rail 16a will engage the other end surface 31d of the pin 31 to maintain the pins 31 and 32 in the positions shown in FIG. 4. When in these positions, the tapered end portion 31c of the pin 31 will engage the left chamfered edge of the notch 33b to prevent axial movement of the shift rail 16b, while the tapered end portion 32c of the pin 32 will engage the chamfered edge 34b of the notch 33c to prevent axial movement of the shift rail 16c.

Thus, with the present invention, axial movement of any one of the shift rails causes at least one of the pins 31 and 32 to be moved axially within the aperture 30 such that the other two shift rails are prevented from moving from their neutral position until the one shift rail has been returned to a neutral position.

In the preferred embodiment of the invention, the pins 31 and 32 are formed with a construction as illustrated in FIG. 6. In FIG. 6, it can be seen that the end surfaces 31d and 31e are substantially flat and perpendicular to a longitudinal axis P of the pin, and that the tapered end portions 31b and 31c are convex with respect to imaginary conical surfaces C (shown in phantom) connecting the cylindrical portion 31a with the end surfaces 31d and 31e. It has been found that, since the convex-tapered end portions provide surfaces which are spaced radially from the axis P by a distance slightly more than the corresponding portion of the conical surfaces, the pins will engage the chamfered edges of the respective notches more readily, and thus produce an interlock mechanism which is less susceptible variations in component dimensions. However, it will be appreciated that, in some instances, it may be desirable to change the configuration of either the tapered end portions 31b and 31c or the end surfaces 31d and 31e. For example, the tapered end portions can actually be conical or concave-tapered, or the end surfaces can be rounded.

Also, while the interlock mechanism of the present invention is utilized in conjunction with shift rails having a rectangular cross-section and downwardly facing semi-cylindrical notches, other types of shift rails could be used with the present invention. For example, the semi-cylindrical notches could be upwardly facing. Also, the shift rail could have a cylindrical cross-section in which case the "notch" could be an annular groove having chamfered edges.

The interlock mechanism of the present invention has been illustrated and described in its preferred embodiment. However, as noted above, modifications can be made to the preferred embodiment of the invention without departing from the scope of the attached claims.

What is claimed is:

1. A shift rail interlock mechanism for a transmission having a plurality of shift rails shiftable along spaced apart and parallel axes, said interlock mechanism comprising:
   housing means for supporting said shift rails for axially shiftable movement along their respective axes, said housing means including an interlock pin aperture intersecting said shift rails and having an axis extending generally transverse to the axes of said shift rails;
   a plurality of interlock pins slidably mounted within said aperture, with a separate interlock pin located between adjacent ones of said shift rails, each of said pins provided with tapered end portions defining end surfaces engageable with end surfaces of adjacent ones of said pins;
   each shift rail provided with a separate notch means for receiving said tapered end portion of at least one of said pins, said notch means located along said shift rails such that (a) when each of said notch means are in axial alignment with one another along said transverse axis of said aperture, said transmission is in a neutral position and (b) when any one of said shift rails is axially shifted from said neutral position, said notch means of said one shifted shift rail engages a tapered end portion of said pin extending into said notch means and causes said pin to be moved within said aperture out of said notch means, said one shifted shift rail being engageable with said end surface of said moved pin to temporarily secure said pins in a predetermined fixed axial position within said notch means of the other ones of said shift rails to prevent axially shiftable movement of any of said shift rails except said one shifted shift rail.

2. The interlock mechanism according to claim 1 wherein each of said notch means are semi-cylindrical.

3. The interlock mechanism according to claim 2 wherein said semi-cylindrical notch means is provided with chamfered ends.

4. The interlock mechanism according to claim 3 wherein each of said shift rails has a generally rectangular cross-section.

5. The interlock mechanism according to claim 1 wherein each of said pins includes a generally cylindrical intermediate portion located between said tapered end portions.

6. The interlock mechanism according to claim 1 wherein said aperture is cylindrical.

7. The interlock mechanism according to claim 6 wherein one end of said aperture is closed by a cylindrical plug means secured within said one end.

8. The interlock mechanism according to claim 7 wherein said cylindrical plug means is provided with an intermediate annular groove for receiving a lock means for retaining said plug means in a selected fixed position within said aperture.

9. The interlock mechanism according to claim 8 wherein said plug means is engageable with an end surface of one of said pins.

10. The interlock mechanism according to claim 1 wherein said transmission includes an outer case, and said housing means is secured to said case.

11. An interlock pin for a transmission interlock mechanism, comprising:
    a cylindrical main body defining a longitudinal axis;

a pair of tapered end portions secured to each end of said main body, at least one of said tapered end portions being formed with a convex taper;

each of said tapered end portions defining an end surface intersecting said axis.

12. The interlock pin according to claim 11 wherein each of said end surfaces are substantially perpendicular to said axis.

13. A transmission interlock mechanism for inhibiting translation of more than one shift rail into a gear engaging position at one time, comprising:

at least three shift rails disposed in spaced apart, parallel relationship and defining parallel axes of translation, each of said shift rails having a semi-cylindrical notch defining a transverse axis perpendicular to the axes of said shift rails in their neutral positions;

at least two elongate interlock pins disposed for translation into said semi-cylindrical notches, said elongate pins including a centrally disposed cylindrical portion and a pair of tapered end portions; and and a housing defining apertures for receiving said shift rails, and an aperture aligned with said transverse axis for receiving said pins.

* * * * *